US012587944B2

(12) United States Patent
Jalkanen et al.

(10) Patent No.: US 12,587,944 B2
(45) Date of Patent: Mar. 24, 2026

(54) MANAGEMENT OF ROUTING

(71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 701 days.

(21) Appl. No.: 17/950,944

(22) Filed: Sep. 22, 2022

(65) Prior Publication Data

US 2023/0090407 A1 Mar. 23, 2023

(30) Foreign Application Priority Data

Sep. 23, 2021 (FI) ..................................... 20215995

(51) Int. Cl.
*H04W 40/20* (2009.01)
*H04W 8/12* (2009.01)

(52) U.S. Cl.
CPC ............. *H04W 40/20* (2013.01); *H04W 8/12* (2013.01)

(58) Field of Classification Search
CPC ....... H04W 40/20; H04W 8/12; H04W 8/082; H04W 48/17
USPC ...................... 455/432.1–435.3, 456.1–456.6
See application file for complete search history.

(56) References Cited

U.S. PATENT DOCUMENTS

| | | | |
|---|---|---|---|
| 9,924,344 B1 | 3/2018 | Datar | |
| 2012/0003980 A1 | 1/2012 | Lim et al. | |
| 2012/0180121 A1* | 7/2012 | Yussouff | H04L 65/4053 726/15 |

| | | | |
|---|---|---|---|
| 2014/0105061 A1* | 4/2014 | Kannan | H04W 48/20 370/254 |
| 2014/0169286 A1* | 6/2014 | Xu | H04W 8/02 370/329 |
| 2018/0324140 A1* | 11/2018 | Cao | H04L 61/5061 |
| 2022/0060883 A1* | 2/2022 | Zhu | H04W 8/245 |
| 2025/0193703 A1* | 6/2025 | Zeng | H04W 24/10 |

FOREIGN PATENT DOCUMENTS

| | | |
|---|---|---|
| EP | 3 503 602 | 6/2019 |
| EP | 3 661 259 | 6/2020 |
| WO | 2009/024182 | 2/2009 |
| WO | 2020/092173 A1 | 5/2020 |

OTHER PUBLICATIONS

Search Report for FI U.S. Appl. No. 20/215,995 dated Apr. 29, 2022, 1 page.
European Search Report issued in European Patent Application No. 22 19 6741 dated Jan. 24, 2023.

* cited by examiner

*Primary Examiner* — Michael Y Mapa
(74) *Attorney, Agent, or Firm* — NIXON & VANDERHYE

(57) ABSTRACT

Disclosed is a solution for controlling a routing of data traffic of a roaming ter-minal device with data network, the method includes: detecting if the terminal device is served by a private network, and in accordance with a detection re-sult performing one of: selecting a network node of the private network for managing the routing if the roaming terminal device is served by the private network; or selecting a network node of a mobile communication network for managing the routing if the terminal device is not served by the private net-work, the method further including: gener-ating a control signal to a respective network the selected network node resides for assigning a responsibility for managing the routing.

15 Claims, 2 Drawing Sheets

MANAGEMENT OF ROUTING

CROSS-REFERENCE TO RELATED APPLICATIONS

This application claims priority to FI patent application No. 20215995, filed Sep. 23, 2021, the entire contents of which are hereby incorporated by reference.

TECHNICAL FIELD

The invention concerns in general the technical field of telecommunications. More particularly, the invention concerns management of communications in mobile communication networks.

BACKGROUND

The concept of roaming is very well known from mobile communication networks, and it refers to a situation in which a mobile communication network outside of the home mobile communication network serves a subscriber of the home mobile communication network. In this kind of approach telecom operators of the different mobile communication networks have agreed on terms of using the services of a visited mobile communication network.

Traditionally, when the subscriber is roaming and wants e.g. to access to a data network, such as to Internet, any traffic from the subscriber is routed from the visited mobile communication network to the home mobile communication network through which the data network is accessed to. The same communication path is applied to when data is routed from the data network back to the subscriber. This kind of home routing approach works well as such but requires a lot of effort in making roaming agreements between the telecom operators. Additionally, due to a long communication path the subscriber may experience latency which causes dissatisfaction.

In order to solve at least some of the above-described issues there is introduced so called local breakout (LBO) approach. In the local breakout approach data traffic is routed directly from the visited mobile communication network to the data network while authentication related tasks and management of the subscription data is handled in the home mobile communication network. This approach is e.g. available e.g. in the 5G communication technology, for example, but also in other network technologies.

Further, in a document WO 2009/024182 A1 it is disclosed a solution for managing local breakout through so-called local breakout policy rules stored in a database which rules define routing parameters for local breakout points which parameters are to be applied for the received IP packets by a gateway node. However, there is a need to establish more sophisticated solutions for routing data traffic.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a control system, a communication system, and a computer program for routing of data traffic.

The object of the invention is reached by a method, a control system, a communication system, and a computer program for routing of data traffic as defined by the respective independent claims.

According to a first aspect, a method for controlling a routing of data traffic of a roaming terminal device with data network is provided, the method, performed by a control system, comprises:

detecting if the roaming terminal device is served by a private network, and in accordance with a detection result performing one of:

selecting a network node of the private network for managing the routing of the data traffic of the roaming terminal device in response to that the detection result indicates that the roaming terminal device is served by the private network; or, selecting a network node of a mobile communication network for managing the routing of the data traffic of the roaming terminal device in response to that the detection result indicates that the roaming terminal device is not served by the private network;

the method further comprising:

generating a control signal to a respective network the selected network node resides for assigning a responsibility for managing the routing of the data traffic of the roaming terminal device.

For example, the detection if the roaming terminal device is served by a private network may be performed on a basis of at least one of the following: an identifier of a serving network received in a communication from the terminal device, a location of the terminal device.

The selection of the network node of the mobile communication network may be performed based on a technical parameter indicative of a communication of the terminal device in the mobile communication network serving the roaming terminal device. The technical parameter may be indicative of a radio technology applied to a communication of the terminal device in the mobile communication network serving the roaming terminal device. Alternatively, the selection of the network node may be performed by selecting the network node of a home communication network in response to a detection that a data rate of the data traffic is below the predefined limit.

The selection of the network node may be performed by selecting the network node configured to manage a regional data traffic in response to a detection that both the roaming terminal device and another communicating party reside in a same regional area.

According to a second aspect, a control system for controlling a routing of data traffic of a roaming terminal device with data network is provided, the control system configured to:

detect if the roaming terminal device is served by a private network, and in accordance with a detection result the control system is configured to perform one of:

select a network node of the private network for managing the routing of the data traffic of the roaming terminal device in response to that the detection result indicates that the roaming terminal device is served by the private network; or select a network node of a mobile communication network for managing the routing of the data traffic of the roaming terminal device in response to that the detection result indicates that the roaming terminal device is not served by the private network;

the control system is further configured to:

generate a control signal to a respective network the selected network node resides for assigning a responsibility for managing the routing of the data traffic of the roaming terminal device.

For example, the control system may be configured to perform the detection if the roaming terminal device is served by a private network on a basis of at least one of the following: an identifier of a serving network received in a communication from the terminal device, a location of the terminal device.

The control system may also be configured to perform the selection of the network node of the mobile communication network based on a technical parameter indicative of a communication of the terminal device in the mobile communication network serving the roaming terminal device. The control system may be configured to interpret the technical parameter as an indication of a radio technology applied to a communication of the terminal device in the mobile communication network serving the roaming terminal device.

The control system may be configured to perform the selection of the network node by selecting the network node of a home communication network in response to a detection that a data rate of the data traffic is below the predefined limit.

Moreover, the control system may be configured to perform the selection of the network node by selecting the network node configured to manage a regional data traffic in response to a detection that both the roaming terminal device and another communicating party reside in a same regional area.

For example, the control system may be at least one apparatus arranged in an IP exchange network, IPX.

According to a third aspect, a communication system is provided, the communication system comprises: a plurality of mobile communication networks wherein a terminal device is served as a roaming terminal device in at least one of the plurality of mobile communication networks, and a control system according to the second aspect as defined above.

According to a fourth aspect, a computer program is provided the computer program comprising instructions which, when the computer program is executed by a computer, cause the computer to perform the method according to the first aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
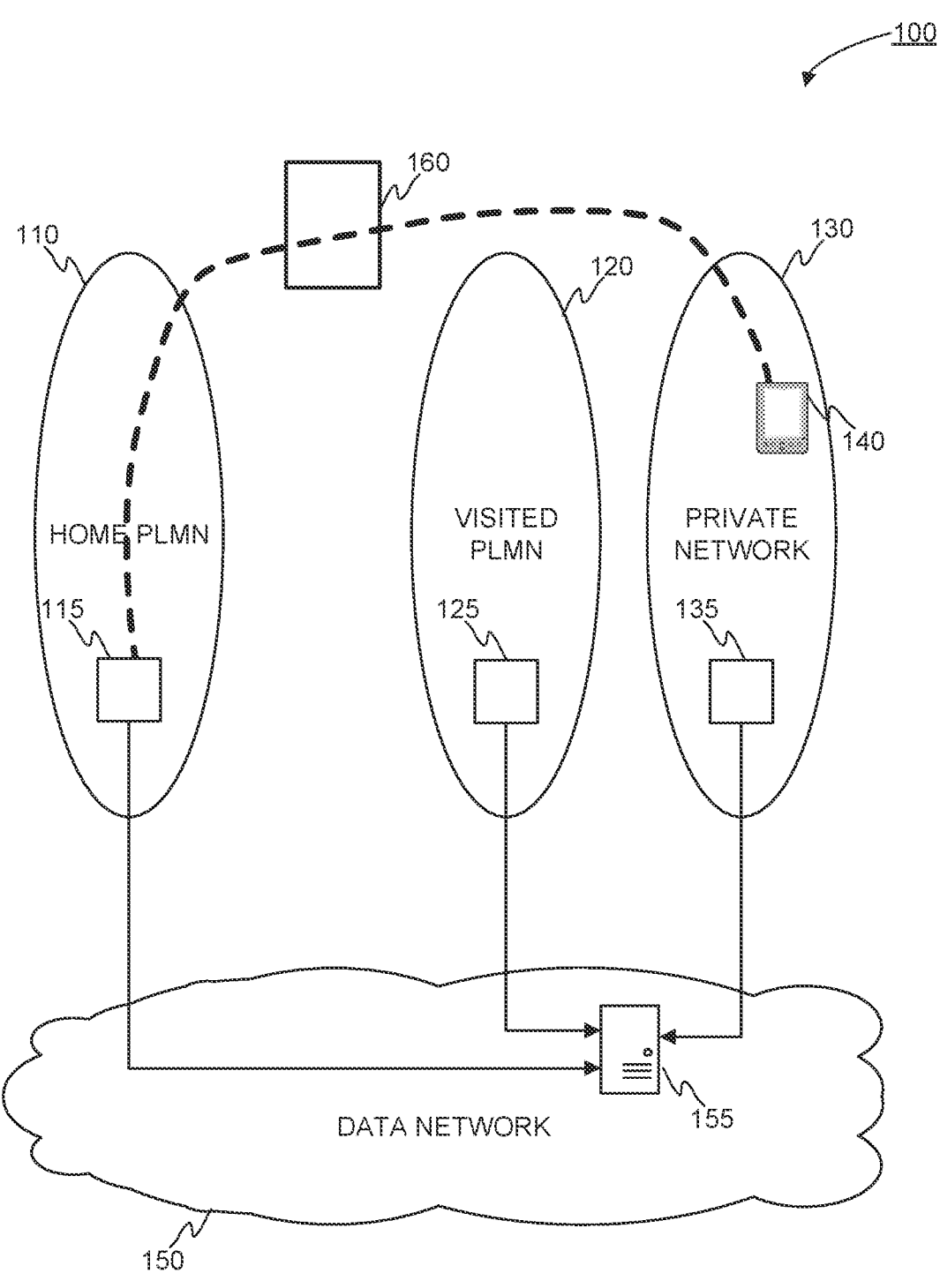
FIG. 1 illustrates schematically a communication system according to an example.

FIG. 1 illustrates schematically an example of a communication system into which the present invention may be implemented to. The communication system comprises a plurality of networks 110, 120, 130 configured to serve terminal devices 140 residing in a service area of the respective network in a situation that the terminal device 140, or the subscription, is allowed to access the respective network 110, 120, 130. The networks 110, 120, 130 are mobile communication networks configured to implement a certain communication technology. According to the present invention at least some of the mobile communication networks 110, 120, 130 are configured to implement a communication technology having a capability to implement a local breakout (LBO) operation. For example, the local breakout operation is available in mobile communication networks implementing a 5G (5$^{th}$ Generation) communication technology. In FIG. 1, the mobile communication network 110 is referred as a home public land mobile network (PLMN) for the terminal device 140. As is known, the home communication network 110 corresponds to the network in which the subscription related data is managed which subscription is included in the terminal device 140 in question. For sake of simplicity, the term terminal device 140 shall be understood in the context of the present invention, unless otherwise mentioned, to include the subscription for the home communication network 110 wherein the subscription may be implemented with a hardware, such as an integrated circuit card, with a software, or with a combination of these two. Further, the mobile communication network referred with 120 may be a public land mobile network managed by another telecom operator into which the terminal device 140 accesses as a roaming subscriber. Further, the mobile communication network referred with 130 in FIG. 1 may be a further network operated by a further operator. The mobile communication network 130 is a private network into which the access may be restricted with any known manner. The private network may also refer to a sub-network of another network, such as a visited PLMN 120. Again, the terminal device 140 may access the mobile communication network 130 as a roaming subscriber. For example, the mobile communication networks may be configured to implement the 5G communication technology. In some embodiments, the private network 130 may be implemented as a wireless local area network, for example.

The communication system may further comprise a packet data network (PDN) 150, such as Internet, into which the plurality of mobile communication networks 110, 120, 130 may be communicatively connected to. In other words, the mobile communication networks 110, 120, 130 comprise necessary hardware and software components as well as interfaces for communicating with entities 155, such as server devices, of the data network 150 e.g. by implementing a predefined communication protocol, such as IP, in the communication between communicating entities. The network nodes referred with 115, 125, 135 are entities in the respective mobile communication networks 110, 120, 130, which may be configured to implement a function to route data traffic to and from the data network 150. The routing of the data traffic through the network node 115 residing in the home communication network 110 may be called as home routing for the terminal device 140 whereas if the routing is performed by another communication network 120, 130 for the terminal device 140, so-called local breakout function may be implemented by the respective network node 125, 135 in a visited communication network in which the terminal device 140 is present as a roaming subscriber. The network nodes 115, 125, 135 may be entities configured to implement a functionality of the local breakout at least in part, such as under control of another entity, and in some example embodiments the network nodes 115, 125, 135 may also comprise applicable interfaces to communicate with the data network 150, and the respective entities therein. For example, the network node 115, 125, 135 may be a gateway device comprising an interface towards the data network 150, such as PGN in mobile communication networks configured to implement 3G technology or MME and SGW in mobile communication networks configured to implement 4G technology. Correspondingly, in a 5G network architecture the network node 115, 125, 135 may be so-called Access and Mobility Management Function (AMF) with so-called User Plane Function (UPF) comprising an interface NG6 towards the data network 150. As mentioned, the operation of the network nodes 115, 125, 135 may be implemented with a cooperation of a plurality of network nodes, or functions therein, in order to control a local breakout operation in accordance with the present invention as described herein.

In accordance with the present invention a control system 160 is provided for controlling at least in part a delivery of data packet-based communication between the terminal device 140 and the data network 150. The control system 160 may refer to a standalone device or a plurality of devices, or a functionality implemented by one or more network devices, to perform a control function as described. The control system 160 may be configured to receive information regarding the communication of the terminal device 140 with one or more entities in the data network 150. Moreover, the control system 160 may store, or at least have access to, data defining service parameters with respect to the various communication networks 110, 120, 130 as well as subscriber related data, such as their identifiers as well as assigned IP addresses for data traffic, which may be used for comparing them with data derivable from communication to which it has access to.

In accordance with an embodiment the information may be received by arranging at least a part of the data traffic between the terminal device 140 and the data network 150 to occur through the control system 160, or at least so that the control system 160 may monitor the data traffic e.g. through an applicable interface, such as through a mirror port. For example, it is illustrated with a dashed line an example of a data path from the terminal device 140 in FIG. 1. Alternatively or in addition to the data traffic the information regarding the communication may be delivered on a control plane using the signaling between the respective entities through the control system 160. In accordance with at least some example embodiments, the information on the communication of the terminal device 140 with one or more entities in the data network 150 delivered over the user plane and/or over the control plane may refer to a piece of information indicating that the terminal device 140 is served by a communication network deviating from the home communication network 110 i.e. the terminal device 140 is a roaming terminal device 140 in the visited communication network. Such piece of information may be delivered between the serving communication network 120, 130 and the home communication network 110 wherein the visited communication network 120, 130 informs the home communication network 110 on that the terminal device 140 is roaming in the respective communication network. The information may e.g. be an identifier of the serving communication network 120, 130 or any other piece of data from which the information is derivable, such as an IP address of the terminal device 140. Alternatively or in addition, the piece of information, i.e. the data received from the respective communication network, may provide details, such as position data of the terminal device 140, or at least data from which the position of the terminal device may be derived, as well as any other relevant information, such as information indicative on a type of data traffic delivered in the communication by the terminal device 140, such as parameters descriptive on technical details applied in the communication with the terminal device 140. In some further example embodiments, the home communication network 110 may be configured to generate a message to inform the control system 160 on the communication network which is providing communication service to the terminal device 140 so as to allow a detection that the terminal device 140 is roaming in the other network than the home communication network 110 in case the data is not delivered through the control system 160.

In the forthcoming description at least some aspects of the present invention are described in a communication environment as provided above. In the present invention for controlling a routing of data traffic of a roaming terminal device 140 with data network 150 it is first detected if the roaming terminal device 140 is served by a private network 130. The detection that the terminal device 140 is served by the private communication network 130 may be performed in a manner as described above, i.e. the terminal device 140 informs the home network 110 on the serving private network 130 with information descriptive of the private network 130 delivered e.g. over signaling, and the information is received by the control system 160 in at least one of the manner as described. For example, the piece of information may be an identifier of the serving private network 130 carried in the signaling. Alternatively or in addition, the detection may be based on a location of the terminal device 140. The location may e.g. be received from location update signaling towards the home communication network 110 e.g. through the control system 160 or by receiving the location, e.g. in response to an inquiry, from the terminal device 140 configured to determine and maintain information on its own location e.g. based on a satellite positioning system or any other. As a result, the control system 160 may receive, or determine, the location of the roaming terminal device 140 at an accuracy defined by the application positioning method and apply it in the detection if the terminal device 140 is served by the private network or not. The detection may, hence, be based on a comparison of the information, cf. the identifier of the serving network 130 and/or the location of the terminal device 140, with data accessible by the control system 160. The data referred herein may be definitions with respect to different communication network, or telecom operators, which are defined when the communication is at least in part agreed to occur through the control system 160.

Next, it is described how the control system 160 is configured to perform in accordance with a detection result with respect to the serving communication network. Namely, the control system 160 is either configured to select a network node 135 of the private network 130 for managing the routing of the data traffic of the roaming terminal device 140 with the data network 150 in response to that the detection result indicates that the roaming terminal device 140 is served by the private network 130. Alternatively, the control system 160 is configured to select a network node 115; 125 of another mobile communication network 110; 120 than the private network for managing the routing of the data traffic of the roaming terminal device 140 in response to that the detection result indicates that the roaming terminal device 140 is not served by the private network 130.

For sake of clarity, it is worthwhile to disclose that the control system 160 is provided with an information on necessary network nodes in each communication network controllable at least in part by it which network nodes are related to the routing of the data as described herein. The selection of the network node shall be understood also to cover an implementation in which the control system 160 does not specifically identify the respective network node but identifies the communication network 110, 120, 130 for managing the routing of the data traffic of the roaming terminal device 140.

In response to a detection of the serving communication network 110, 120, 130 the control system 160 is configured to generate a control signal to the selected communication network 110, 120, 130, and possibly even to a network node 115; 125; 135 therein, for assigning a responsibility for managing the routing of the data traffic of the roaming terminal device 140. In case the control signal is generated to a selected network node 115, 125, 135 in the respective network, the selected network node 115, 125, 135 initiates necessary processes for managing the routing of the data with the data network 150. On the other hand, if it is indicated to the selected network with the control signal that it is selected for managing the routing of the data traffic, the respective communication network 110, 120, 130, and e.g. to a control entity, such as MME, therein, may be arranged to perform necessary operations internally to implement the routing to the data network 150 for the roaming terminal device 140.

In some further example embodiments, the terminal device 140 is not even served by the private network 140 yet, but the control system 160 is configured to detect, e.g. based on the location of the terminal device 140 that at the location of the terminal device 140 there is a private network 130 available to which the terminal device 140 may be attached for service. In response to such a detection, the control system 160 may be arranged to generate a control signal to the terminal device 140 which causes the terminal device 140 to select and attach to the respective private network 140 e.g. instead of another VPLMN available in the same location. In this manner the control system 160 may control the terminal device 140 to utilize the services of such networks, like private networks, with whom it has agreements in place even if the telecom operator of the home communication network 110 for the terminal device 140, and the subscription therein, does not have such agreements in place. In case the telecom operator of the home communication network 110 does not have the agreement in place with the operator of the private network 130, it means that there does not occur any signalling from the private network 130 to the home communication network 110.

The above-described primary scenario of the invention is based on the detection if the terminal device 140 roams in a private network wherein the private network refers to a communication network to which an access is limited, and the subscribers need to be granted an access to use the service of the respective private network 130. In such a case the private network is instructed to manage the data traffic directly between the terminal device 140 and a network entity 155, such as a server, residing in the data network 150.

However, in case the private network is not serving the terminal device 140, or not even available for the selection, the control system 160 may be configured to select the network 110, 120, and the network node 115, 125, for managing the routing of data traffic, such as IP based data traffic, with other grounds. In accordance with an example embodiment the control system 160 may be configured to perform the selection of the network node 115, 125 of the communication network 110, 120 based on a predefined analysis. The predefined analysis may be based on at least one characteristic of data traffic executed by the roaming terminal device 140. In accordance with one example embodiment the at least one characteristic may relate to a technical aspect of the communication, such as to an applied radio technology, or to data rate, transmission data bandwidth or speed, used in the communication. Hence, it may be arranged that in case the terminal device 140 is served by a certain communication network 120 as a roaming subscriber, and the terminal device applies a certain radio technology, such as technology complying with 5G standards, the control system 160 is configured to select a certain network node 125 for managing the routing of the data traffic to and from the data network 150. In case some more detailed technical parameter is applied to, a limit may be defined for the respective parameter, such as for the data rate or speed which is used for selecting a path for routing the data traffic between the roaming terminal device 140 and the communicating entity 155, such as a server, residing in the data network 150. For example, in response to a detection that the data rate exceeds the predefined limit the routing control system 160 may be configured to select a network node 125 for managing the routing of the data traffic of the terminal device 140 that resides in the visited communication network 120. On the other hand, if the data rate is below the predefined limit the control system 160 may select a network node 115 residing in the home communication network 110 for managing the data traffic of the terminal device 140 from the visited communication network 120, 130 through the home communication network 110 to the data network 150. Alternatively or in addition, the selection of the network node 115, 125, 135 may be performed by selecting the network node 115, 125, 135 configured to manage a regional data traffic in response to a detection that both the roaming terminal device and another communicating party reside in a same regional area. This kind of approach may be established by taking into account information of the communication network 110, 120, 130 serving the terminal device 140 as a roaming subscriber and information, such as IP address, of the communicating party, such as a server, residing in the data network 150 so as to determine locations of the respective entities and if advantageous to select the network node 115, 125, 135 configured to operate regionally in routing data traffic. The regional operation may e.g. be implemented if the communicating entities reside geographically in a predefined area, such as in the same continent and, hence, data traffic between the continents may be prevented and e.g. costs but also latency in the communication may be reduced.

Still further criteria for selecting the network node for managing the routing of the data traffic may be a service type used by the terminal device in the communication. For example, a voice call service may be routed through the home network 110 whereas other IP traffic may be routed through the serving mobile communication network. In this scenario, the control system may detect the service type from the communication going through the control system 160. Another applied criterion may be the protocol used by the terminal device 140, a quality of service required for the data traffic, or a price of the communication, as well as latency of communication, propagation delay, or security, for example. However, in the context of the present invention a detection of the availability of the private network is the main criteria at the first place as described.

Figure 2:
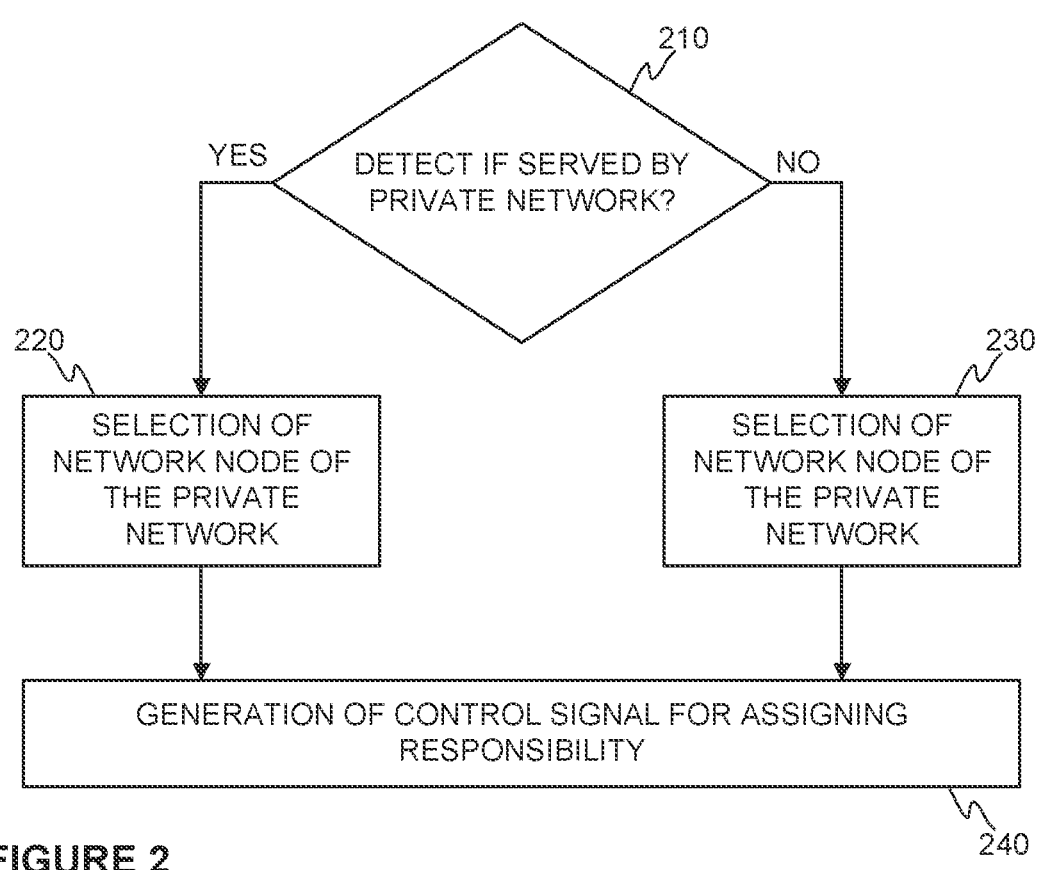
FIG. 2 illustrates schematically a method according to an example.

FIG. 2 illustrates schematically a method according to an example of the invention. The method is described from a control system 160 point of view. First, the control system 160 may be configured to detect 210 if the terminal device 140 is served by a private network 140. This may also cover an option that the terminal device 140 could be served at its location by a private network 140 wherein an attachment to the respective private network 130 is at least in part controllable by the control system 160. In response to a detection that the private network 130 is serving the terminal device 140 a network node 135 of the private network 130 may be selected 220 to manage a routing of the data traffic of the roaming terminal device 140 to and from the data network 150. on the other hand, if it is detected that the terminal device 140 is not served by the private network 130, a network node 115; 125 of a mobile communication network 110; 120 is selected 230 for managing the routing of the data traffic of the roaming terminal device 140. In the selection further parameters, such as technical parameters indicative of a type of communication of the terminal device 140, may be applied to for selecting the communication network 110, 120, and a network node, for managing the routing. Finally, in response to that the network node for managing the routing of the data traffic is found and selected, the control system 160 may be configured to generate 240 a control signal to the respective entity which causes that the entity, i.e. the selected network node 115, 125 start managing and controlling the data traffic between the data network 150 and the roaming terminal device 140. In such a manner an optimal breakout point may be found for the terminal device 140 and the data traffic is not anymore routed through the home communication network 110 unless otherwise decided. For example, if the amount of data is small and e.g. without any speed related constraints it may be optimal to route the data traffic through the home communication network 110.

In some example embodiment the control system 160 may reside in a network also suitable for applying the local breakout. Such a network may e.g. be so-called IP exchange (IPX) network model for exchanging IP based data traffic between communication networks of different operators. The IPX model is arranged to operate via IP based Network-to-Network Interface. For example, in accordance with the present invention the control system 160 residing in the IPX network may be configured to performed so-called regional breakout operation by means of which latency may be reduced in the communication. Additionally, the IPX model may be applied in the context of the present invention in a manner that the IPX network operator makes the agreements with the other operators, and, thus, receives a variety of technical details of the respective networks, which allows the control system 160 having access to such data select an optimal network, and a network node, for managing the routing of the data traffic i.e. selecting an optimal local breakout point so as to avoid the routing through the home network.

Generally speaking, the present invention may utilize any type of breakout operation. In other words, as a consequence of the selection 210 of the network node 115, 125, 135 and the generation 220 of the control signal a local breakout operation, a regional breakout, an edge breakout, or a private breakout may be called to, for example. The edge breakout may refer to an implementation in which user plane traffic is routed close to the terminal device 140 to the data network 150 i.e. close to the edge of the serving communication network. The private breakout may refer, as already discussed, to an implementation in which the control system 160 causes a breakout operation to occur in the private network serving the terminal device 140 as a roaming subscriber.

Figure 3:
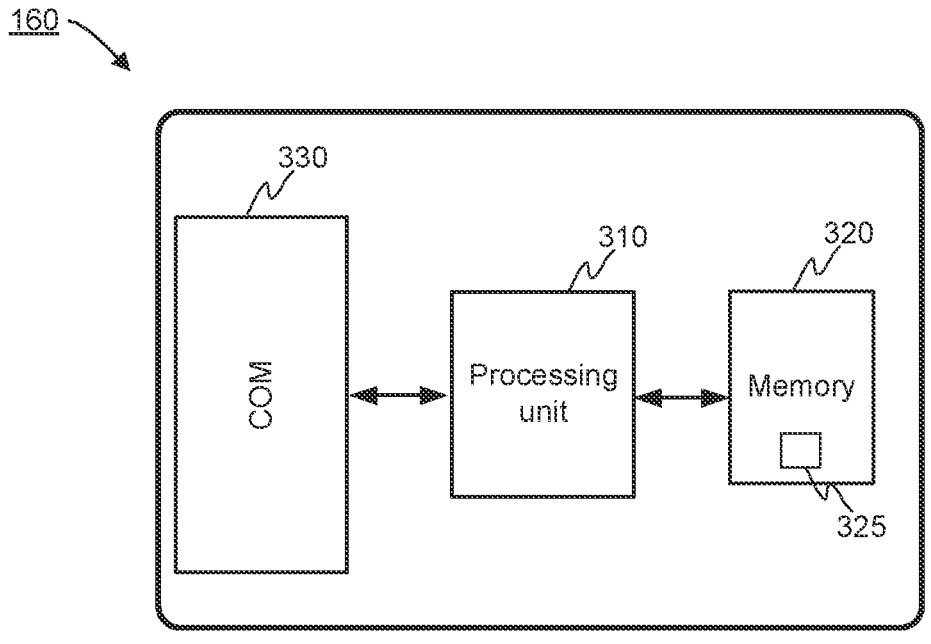
FIG. 3 illustrates schematically an apparatus configurable to implement a control system according to an example.

An example of an apparatus suitable for performing a task of the control system 160 according to an example embodiment the invention is schematically illustrated in FIG. 3. The apparatus may be configured to implement at least part of the method for routing of data traffic of a roaming terminal device 140 with data network 150 as described. The execution of the method, or at least some portions of it, may be achieved by arranging at least one processor 310 to execute at least some portion of computer program code 325 stored in at least one memory 320 causing the processor 310, and, thus, the apparatus as the control system 160 to implement one or more method steps as described. In other words, the processor 310 may be arranged to access the memory 320 and to retrieve and to store any information therefrom and thereto. Moreover, the processor 310 may be configured to control a communication through one or more communication interfaces 330 for accessing the other entities being involved in the operation. Hence, the communication interface 330 may be arranged to implement, possibly under control of the processor 310, corresponding communication protocols, such as an IP, for communicating with one or more entities. The term communication interface 330 shall be understood in a broad manner comprising necessary hardware and software elements for implementing the communication techniques. Further, the apparatus in question may comprise one or more input/output devices for inputting and outputting information. Such input/output devices may e.g. be keyboard, buttons, touch screen, display, loudspeaker, microphone camera and so on. In some implementation of the apparatus at least some of the input/output devices may be external to the apparatus and coupled to it either wirelessly or in a wired manner. For sake of clarity, the processor 310 herein refers to any unit or a plurality of units suitable for processing information and control the operation of the apparatus in general at least in part, among other tasks. The mentioned operations may e.g. be implemented with a microcontroller solution with embedded software. Similarly, the invention is not limited to a certain type of memory 320, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus.

For sake of completeness, the operation of the control system 160 may be implemented with a plurality of apparatuses as e.g. illustrated in FIG. 3 and arranged to cooperate in a distributed computing environment.

Moreover, some aspects of the present invention may relate to a computer program product which, when executed by at least one processor, cause an apparatus, such as the control system 160, to perform at least some portions of the method as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for controlling a routing of data traffic of a roaming terminal device with data network, the method, performed by a control system, comprising:

detecting whether or not the roaming terminal device is served by a private network to obtain a detection result;

in accordance with the detection result, one of:

selecting a network node of the private network configured to manage the routing of the data traffic of the roaming terminal device in response to the detection result indicating that the roaming terminal device is served by the private network, and selecting a network node of a mobile communication network configured to manage the routing of the data traffic of the roaming terminal device in response to the detection result indicating that the roaming terminal device is not served by the private network; and generating a control signal to a respective network the selected network node resides to assign a responsibility for managing the routing of the data traffic of the roaming terminal device.

2. The method of claim 1, wherein the detection that the roaming terminal device is served by the private network is performed based on at least one of the following: an identifier of a serving network received in a communication from the terminal device, and a location of the terminal device.

3. The method of claim 1, wherein the selection of the network node of the mobile communication network is performed based on a technical parameter indicative of a communication of the terminal device in the mobile communication network serving the roaming terminal device.

4. The method of claim 3, wherein the technical parameter is indicative of a radio technology applied to the communication of the terminal device in the mobile communication network serving the roaming terminal device.

5. The method of claim 3, wherein the selection of the network node is performed by selecting the network node of a home communication network in response to a detection that a data rate of the data traffic is below the predefined limit.

6. The method of claim 1, wherein the selection of the network node is performed by selecting the network node configured to manage a regional data traffic in response to a detection that both the roaming terminal device and another communicating party reside in a same regional area.

7. A control system for controlling a routing of data traffic of a roaming terminal device with data network, the control system comprising:

one or more processors configured to:

detect whether or not the roaming terminal device is served by a private network to obtain a detection result, in accordance with the detection result, one of:

select a network node of the private network configured to manage the routing of the data traffic of the roaming terminal device in response to the detection result indicating that the roaming terminal device is served by the private network, and select a network node of a mobile communication network configured to manage the routing of the data traffic of the roaming terminal device in response to the detection result indicating that the roaming terminal device is not served by the private network, and generate a control signal to a respective network the selected network node resides to assign a responsibility for managing the routing of the data traffic of the roaming terminal device.

8. The control system of claim 7, wherein the one or more processors is configured to perform the detection that the roaming terminal device is served by the private network based on at least one of the following: an identifier of a serving network received in a communication from the terminal device, and a location of the terminal device.

9. The control system of claim 7, wherein the one or more processors is configured to perform the selection of the network node of the mobile communication network based on a technical parameter indicative of a communication of the terminal device in the mobile communication network serving the roaming terminal device.

10. The control system of claim 9, wherein the one or more processors is configured to interpret the technical parameter as an indication of a radio technology applied to the communication of the terminal device in the mobile communication network serving the roaming terminal device.

11. The control system of claim 9, wherein the one or more processors is configured to perform the selection of the network node by selecting the network node of a home communication network in response to a detection that a data rate of the data traffic is below the predefined limit.

12. The control system of claim 7, wherein the one or more processors is configured to perform the selection of the network node by selecting the network node configured to manage a regional data traffic in response to a detection that both the roaming terminal device and another communicating party reside in a same regional area.

13. The control system of claim 7, wherein the control system is at least one apparatus arranged in an IP exchange network (IPX).

14. A communication system comprising:

a plurality of mobile communication networks, a terminal device serving as a roaming terminal device in at least one of the plurality of mobile communication networks; and a control system configured to:

detect whether or not the roaming terminal device is served by a private network to obtain a detection result, and in accordance with the detection result, one of:

select a network node of the private network configured to manage the routing of the data traffic of the roaming terminal device in response to the detection result indicating that the roaming terminal device is served by the private network, and select a network node of a mobile communication
network configured to manage the routing of the
data traffic of the roaming terminal device in
response to the detection result indicating that the
roaming terminal device is not served by the
private network, and generate a control signal to a respective network the
selected network node resides to assign a responsi-
bility for managing the routing of the data traffic of
the roaming terminal device.

15. A non-transitory computer-readable medium on which
is stored a computer program comprising instructions which,
when the computer program is executed by a computer,
cause the computer to perform a method comprising:

detecting whether or not a roaming terminal device is served by a private network to obtain a detection result;

in accordance with the detection result, one of:

selecting a network node of the private network con-
figured to manage the routing of the data traffic of the
roaming terminal device in response to the detection
result indicating that the roaming terminal device is
served by the private network, and selecting a network node of a mobile communication
network configured to manage the routing of the data
traffic of the roaming terminal device in response to
that the detection result indicating that the roaming
terminal device is not served by the private network;
and generating a control signal to a respective network the
selected network node resides to assign a responsibility
for managing the routing of the data traffic of the
roaming terminal device.

* * * * *